J. BAINS.
Hydrant-Valve.

No. 200,162. Patented Feb. 12, 1878.

WITNESSES.
J. W. Garner.
W. S. D. Haines.

INVENTOR.
Jas. Bains
per
J. A. Lehmann.
atty

UNITED STATES PATENT OFFICE.

JAMES BAINS, OF CINCINNATI, OHIO, ASSIGNOR OF ONE-HALF HIS RIGHT TO JOS. L. COCHRAN, OF SAME PLACE.

IMPROVEMENT IN HYDRANT-VALVES.

Specification forming part of Letters Patent No. 200,162, dated February 12, 1878; application filed January 23, 1878.

*To all whom it may concern:*

Be it known that I, JAMES BAINS, of Cincinnati, in the county of Hamilton and State of Ohio, have invented certain new and useful Improvements in Hydrant-Valves; and I do hereby declare the following to be a full, clear, and exact description of the invention, such as will enable others skilled in the art to which it pertains to make and use it, reference being had to the accompanying drawings, which form part of this specification.

My invention relates to an improvement in hydrant-valves; and it consists in the arrangement and combination of parts whereby all of the waste-water is forced upward through the discharge-pipe, leaving no water to remain in the waste-water chamber, so as to freeze in the winter, and in locating the waste-water chamber below the water-main, so as to be beyond the reach of the frost, as will be more fully described hereinafter.

Figure 1:
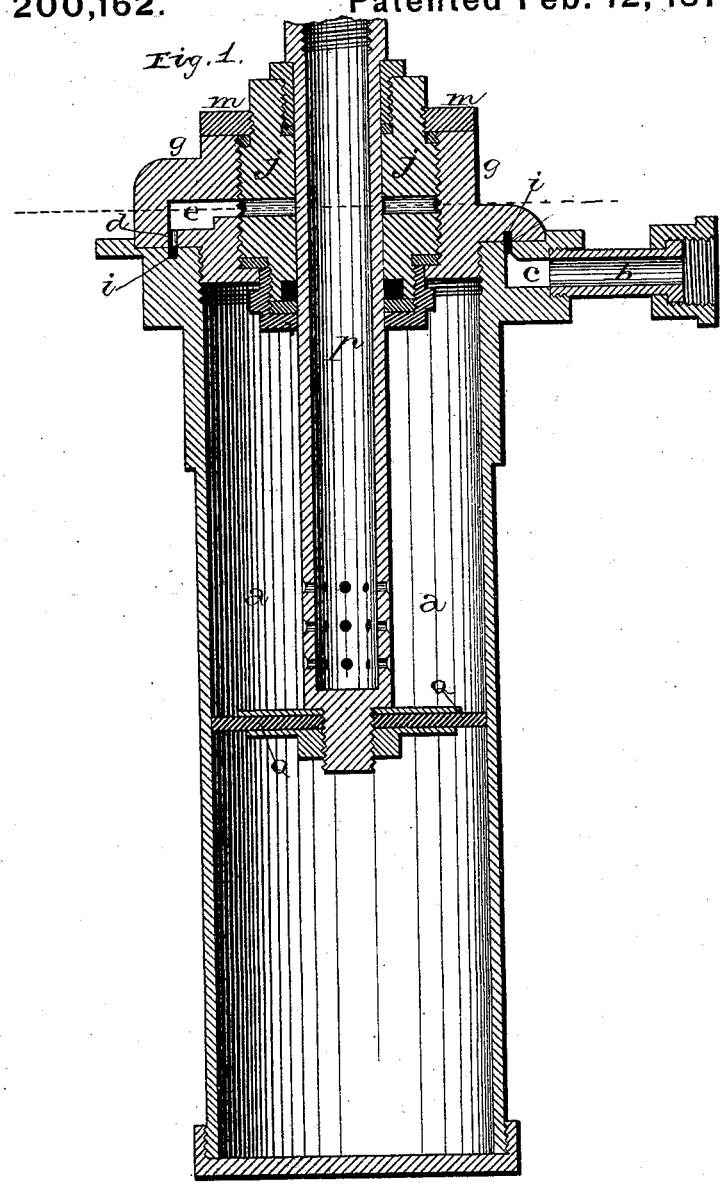
Figure 2:
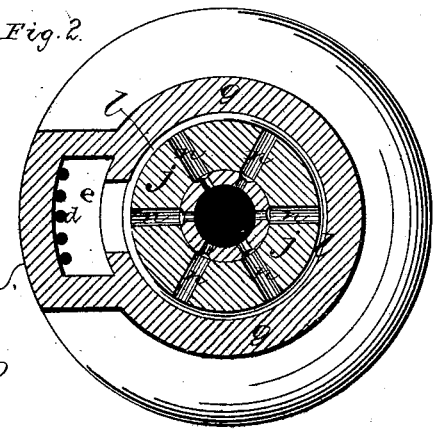

Figure 1 represents a vertical section of my invention. Fig. 2 is a horizontal section through the cover.

$a$ represents the waste-chamber, which is preferably made cylindrical in form, and of any desired size that may be preferred. This chamber is located below the level of the water-main, so that the waste-water cannot freeze therein in very cold weather. The water passes through the opening $b$, in the upper end of this chamber, into the small chamber $c$, formed upon one side of the waste-water chamber. From this chamber $c$ the water passes upward through the small openings $d$, formed in the top of the waste-water chamber $a$, into the chamber $e$, formed upon the top of the nut or cover $g$, which closes the top of the chamber $a$. In the top of the chamber $a$, and in the under side of the nut $g$, are formed one or more suitable grooves, $i$, through which the water can freely pass in case the chamber $c$ (upon the side of the cylinder $a$) and the chamber $e$ (upon the side of the nut) should not come together when the nut is screwed into position. By means of this groove it is immaterial, in screwing the nut $g$ into position, whether the chambers $e$ $c$ come together or not, for the water will pass as freely through the groove as it would if the two chambers were together. From the chamber $e$ the water passes inward through the nut or cover $g$, through the holes made into the nut $j$, which screws down into the cover $g$. Around the outside of this nut $j$ is made a groove, $l$, so that when the water passes through the cover $g$ it will at once pass all around the nut $j$, and enter through the many openings $n$, made through the nut. Instead of the many holes $n$ here shown, but a single slot may be made through this nut for the passage of the water, which will answer the same purpose equally as well.

Upon the top of this nut $j$ is screwed the nut $m$, which tightens the washer down upon the top of the cover $g$, so as to prevent any upward leakage of water. Passing down through the center of the nut $j$ is the supply-pipe $p$, which plays vertically up and down through the nut, as shown. In the upper part of the nut $j$ is formed a packing-box, for the purpose of forming a tight joint where the pipe $p$ passes through, and thus preventing leakage of the water.

Upon the lower end of this supply-pipe or water-way $p$ is secured a suitable plunger or piston, $q$, of leather or any other suitable material, which fits the cylinder $a$ water-tight, and serves to lift or discharge all the waste-water which has run from the pipe $p$ and valve into this chamber. Through the lower end of the pipe $p$ are made a number of holes, through which the water in the pipe or valve, after the water has been cut off, escapes into the chamber $a$ above the piston.

Instead of the number of small holes here shown, a single slot may be used, if so preferred. When the water is shut off, this pipe $p$ is depressed downward into the chamber $a$; but when it is desired to draw water, the pipe is raised upward by any suitable mechanism until the holes or hole in its lower end comes just opposite to the holes or hole made through the side of the nut $j$. When the holes in the pipe $p$ come just opposite the holes in the nut $j$ the water passes freely through the two chambers $c$ $e$, through the nut or cover $g$, and through the nut $j$ into the pipe, and thence on up to the discharge.

As soon as the water is cut off the pipe $p$ is depressed downward below the holes in the nut $j$, when all the water that is left in the pipe $p$ at once runs into the waste-chamber. As soon as water is again drawn from the hydrant, the upward lift of the pipe $p$ serves first to empty all this waste-water before any fresh water can pass into the pipe, and then each time that the hydrant is used the waste-water is discharged from the cylinder by the upward movement of the piston.

By the arrangement of parts above described there will be no water left in the chamber to freeze, and the valve will always be kept dry upon both the inside and the outside when the hydrant is in use. No water can leak from the valve into the stock or ground, nor will any water remain in the stock to freeze after the water has been shut off. Should the packing at any time become loose and need repairing from wear, the waste-water will rise to the top of the pipe $p$, and, by its escape at the discharge, indicate that repairs are necessary.

Although the cover $g$ and the nut $j$ are here shown as two separate and distinct parts, in practice they may be made in a single casting, so as to make them both cheaper and simpler in construction, and in which case there will be an opening made directly through to the pipe $p$ from the chamber $e$, so as to let the water flow direct to the pipe.

Having thus described my invention, I claim—

1. The combination of the waste-water chamber $a$, having a chamber, $c$, formed at the end of the inlet-pipe $p$, nut or cover $g$, having the chamber $e$, and the groove or grooves in the top of the chamber and the under side of the nut, whereby the water can pass from the chamber $c$ into $e$, whether the two chambers are together or not, substantially as shown.

2. The combination of the waste-water chamber $a$, chambers $c$ $e$, nut or cover $g$, having an opening or openings through its side, communicating with the chamber $e$, and the vertically-adjustable pipe $p$, having a hole or holes through its lower end, substantially as set forth.

3. The combination of the vertical adjustable pipe $p$, having a hole or holes through its lower end, and a piston or plunger attached thereto, waste-water chamber $a$, nut $j$, cover $g$, chambers $c$ $e$, and connecting grooves, all arranged to operate substantially as and for the purposes specified.

In testimony that I claim the foregoing I have hereunto set my hand this 22d day of January, 1878.

J. BAINS.

Witnesses:
 J. W. PILLING,
 ROBT. M. BARR.